(12) United States Patent
Nguyen et al.

(10) Patent No.: US 7,781,929 B1
(45) Date of Patent: Aug. 24, 2010

(54) SHAPED FLUID DYNAMIC BEARING FOR A HARD DISK DRIVE

(75) Inventors: Diep Nguyen, Castro Valley, CA (US); Hamid Salehizadeh, San Francisco, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 524 days.

(21) Appl. No.: 11/292,211

(22) Filed: Nov. 30, 2005

Related U.S. Application Data

(60) Provisional application No. 60/632,409, filed on Dec. 2, 2004.

(51) Int. Cl.
*H02K 5/16* (2006.01)

(52) U.S. Cl. .......................................... 310/90

(58) Field of Classification Search .................. 310/90, 310/90.5
See application file for complete search history.

(56) References Cited

U.S. PATENT DOCUMENTS

| | | | | |
|---|---|---|---|---|
| 6,127,756 | A * | 10/2000 | Iwaki et al. | 310/90 |
| 6,292,328 | B1 * | 9/2001 | Rahman et al. | 360/99.08 |
| 6,921,209 | B2 * | 7/2005 | Hoffmann et al. | 384/110 |
| 7,218,023 | B2 * | 5/2007 | Hirose et al. | 310/90 |
| 2004/0169430 | A1 * | 9/2004 | Winterhalter | 310/90 |

* cited by examiner

*Primary Examiner*—Nguyen N Hanh
(74) *Attorney, Agent, or Firm*—Dergosits & Noah LLP

(57) ABSTRACT

A system is provided that increases the spindle stiffness of a disk drive while optimizing power consumption. A multipurpose bearing provides axial stiffness and enhanced stiffness against radial and pitch loads applied to the spindle. When used in combination with a journal bearing, conventional thrust bearings may be eliminated without sacrificing overall stiffness. As a result, the height of the disk drive may be reduced, thereby making the system desirable to be used in smaller electronic devices.

35 Claims, 6 Drawing Sheets

(Priot Art)

SHAPED FLUID DYNAMIC BEARING FOR A HARD DISK DRIVE

This application claims the benefit of U.S. Provisional Patent Application Ser. No. 60/632,409, filed Dec. 2, 2004, which is incorporated by reference in its entirety herein.

FIELD OF THE INVENTION

The present invention relates generally to hard disk drives that utilize a fluid dynamic bearing to support a spindle shaft. One embodiment of the present invention employs a particularly shaped spindle bearing that eliminates the need for a thrust bearing generally used in the art.

BACKGROUND OF THE INVENTION

Disk drive memory systems store digital information in concentric tracks on a magnetic disk. The disk itself is rotatably mounted on a spindle, and information is accessed by means of read/write head located on a pivoting arm able to move radially over the surface of the disk. The radial movement of the head allows the different tracks to be accessed. Rotation of the disk allows the read/write head to access different sectors of the disk.

The spindle of a hard disk drive generally includes a spindle shaft that is interconnected to a hub that secures at least one disk. The disk is spun at a high rate of speed relative to the transducer head that reads and writes data from/to the disk. The hub and spindle are driven by an interaction of a magnetic field of a permanent magnet located on or otherwise associated with the hub and a magnetic field generated by a stator motor secured to a base plate of the disk drive housing. Stator coils are activated in a predetermined sequence to generate a variable magnetic field and drive the permanent magnet associated with the hub which initiates and sustains rotation of the disk.

Heads are designed to fly above the surface of the rotating disk. It is desirable to maintain a precise span or gap between the head and disk surface to achieve a low position error signal (PES) and thereby reduce read/write errors. As the head moves away from the disk surface, noise increases and read/write errors are more likely to occur. It is also critical that heads are able to maintain their position above intended tracks on a disk surface. Should a spindle move radially relative to its position as originally installed, particularly as track densities increase, errors can also occur in positioning the head relative to an intended track. Thus, the spindle shaft must be held in a predetermined and fixed orientation in order to minimize spindle tilt and associated disk flutter or wobble which varies the gap between the head and disk surface and in order to minimize radial movement or drift of the spindle. Both of these problems may be addressed by increased spindle stiffness.

Spindle stiffness is often accomplished by the utilization of a bearing sleeve. The sleeve is positioned around the spindle shaft and includes at least one journal bearing that interfaces directly with the spindle shaft through an intermediate lubricating fluid. In order to ensure that the fluid is positioned between the journal bearing and the spindle shaft and to provide enhanced stiffness, grooves may be employed on bearing surface as taught in U.S. Pat. No. 6,313,967, which is incorporated by reference in its entirety herein. Journal bearings increase the radial stiffness of the spindle shaft, restricting radial movement of the spindle in a direction perpendicular to the axis rotation of disks. Journal bearings also substantially prevent tilting of the spindle shaft relative to the spin axis of the spindle and disk.

Bearing sleeves of the prior art generally include an upper journal bearing surface and a lower journal bearing surface wherein the distance between the centers of the two bearing surfaces equals the total bearing span. The greater the total bearing span, the greater the pitch stiffness provided to the spindle. Bearing stiffness can also be increased by reducing the space or gap between the sleeve and the spindle shaft. Reduction in radial gap, however, leads to an increase in bearing drag and thus an increase in the power required to maintain a predetermined spin rate of the disks.

Another way to increase bearing stiffness is to apply axial loading to the spindle. One method of accomplishing this is to apply a predetermined amount of compression to the spindle upon installation and forcing a bearing surface associated with the spindle against a thrust plate disposed opposite the spindle bearing surface, typically at one end of the spindle. Utilizing a double thrust bearing, which incorporates a thrust plate at both ends of the spindle shafts, further enhances stiffness. Another method to enhance stiffness is to magnetically induce an axial load on the hub that presses the spindle shaft onto a thrust bearing that is located at the end of the spindle shaft and beneath the hub. A magnetic bias plate is used to draw a magnet disposed on the hub downward and thereby force the spindle shaft onto the thrust bearing. Disk drives that utilize thrust bearings have the disadvantage of having to accommodate the vertical height of the thrust bearing. Increased height may limit the applicability of using the disk drive in small electrical devices where vertical or Z height is a factor. Furthermore, even though a double thrust bearing system often used in the art can be more robust than a single thrust bearing, it does not provide sufficient stiffness in a disk drive using 2.5 inch diameter or smaller media.

Thus, it is a long felt need in the field of magnetic disk drive manufacturing to provide increased bearing stiffness to counteract radial and pitch loading while allowing for reduction in disk drive height. The following specification describes a system that employs a multipurpose bearing that substantially combines the functions of the thrust and journal bearings to enhance stiffness, while simultaneously counteracting radial and pitch loads on the shaft. As a result, the thrust bearing traditionally used in prior art disk drives may be eliminated to allow for the disk drive to be reduced in height without sacrificing spindle stiffness. Embodiments of the present invention optionally permit the elimination of the magnetic bias plate which reduces magnetic noise and cost.

SUMMARY OF THE INVENTION

It is one aspect of the present invention to provide a disk drive that includes a spindle shaft that is supported by a sleeve with a journal bearing and that is interconnected to a multipurpose bearing. More specifically, embodiments of the present invention include a hub interconnected to the spindle shaft. The spindle shaft is supported by a journal bearing positioned around the spindle shaft. The journal bearing interfaces with an inner diameter of the sleeve. The multipurpose bearing is interconnected to at least one end of the spindle shaft and interacts with a surface of the sleeve disposed generally perpendicular to the axis of rotation of the spindle. By interacting with a surface of the sleeve, the multipurpose bearing of the present invention provides useful axial loading while counteracting harmful axial loads, such as those generated by radial loading of the spindle, the multipurpose bearing also interacts with a surface disposed on a closing plate. By interacting with a surface of the closing plate, the multipurpose bearing also counteracts radial loads that would either displace the shaft from its original position and loads that would tilt the shaft in relation to the sleeve. Thus, the multipurpose bearing counteracts harmful axial, radial and tilt loads on the spindle.

It is another aspect of the present invention to eliminate the need for a thrust bearing. The multipurpose bearing provides useful axial loads that generally maintain or increase the same level of spindle shaft stiffening as provided by a thrust bearing. Further, since the thrust bearing is no longer required because of the beneficial axial loading provided by the multipurpose bearing, the disk drive may be decreased in height.

In a preferred embodiment of the present invention, the multipurpose bearing has a frusto-conical shaped outer or lateral surface. The conical-shaped surface, by the nature of its angled orientation relative to the axis of rotation of the spindle, applies an axial load for needed stiffness. The conical bearing also counteracts tilt and radial loads. One skilled in the art will appreciate that although a frusto-conical shaped bearing is described herein, other shapes, such as a partial sphere, may be employed without departing from the scope of the invention. Further, embodiments of the present invention allow for reduction in journal bearing and sleeve height since the multipurpose bearing provides an increased or longer total bearing surface while eliminating the height taken by the thrust bearing. Additionally, the frusto-conical shaped bearing also performs radial stiffening and stiffening against tilt or pitch loads.

Magnetic bias plates are also used to increase axial stiffness. A magnetic bias plate interacts with permanent magnets situated on the rotating hub. The permanent magnets of the hub are attracted to the bias plate thereby pulling the hub and spindle shaft downwardly onto the thrust bearing to increase stiffness. Use of a magnetic bias plate, however, increases magnetic noise in the system, which may have an adverse affect on performance. Thus, it is one aspect of the present invention to provide a system that does not require the use of the magnetic bias plate. The stiffness provided by the multipurpose bearing of some embodiments of the present invention in combination with the journal bearing is adequate to provide sufficient stiffness or increased stiffness over the prior art. Since the magnetic bias plate may be omitted, costs related to assembly and parts is necessarily decreased. However, it should be understood by one skilled in the art that the magnetic bias plate may still be employed to further increase the stiffness provided by the shaped bearing.

As alluded to above, it is yet another aspect of the present invention to reduce magnetic noise. More specifically, when the permanent magnet rotates, its electric field will interact with the magnetic bias plate thereby causing a current to be generated therein. This current will necessarily induce a magnetic field around the magnetic bias plate that will affect the interaction between the magnetic field of the permanent magnet and the stator coils thereby adversely affecting performance of the disk drive. By omission of the magnetic bias plate, these harmful magnetic influences are avoided. However, one skilled in the art will appreciate that in order to further increase stiffness, a bias plate may be included in some embodiments and the magnetic noise can be tolerated.

As briefly mentioned above, it is yet another aspect of the present invention to increase the effective journal bearing span. The "effective" journal bearing span is increased by embodiments of the present invention since the journal bearing and the thrust component of the multipurpose bearing operate in concert. More specifically, the effective journal bearing span is the distance between the center of the conical bearing to the center of the journal bearing. The increased total bearing surface area increases spindle shaft stiffness.

It is another aspect of the present invention to provide a disk drive that is less costly to manufacture. More specifically, by employing a frusto-conical, or functionally similarly disposed bearing, costs associated with parts and assembly of more complex multi-bearing systems may be avoided. Thus, embodiments of the present invention include a more cost effective bearing system that also has the advantage of increased system performance.

It is still yet another aspect of the present invention to provide a bearing system that decreases power consumption while manufacturing sufficient spindle shaft stiffness. As previously noted, one way to increase the bearing stiffness is to reduce the gap between the journal bearing and the spindle shaft. However, this method also increases power consumption and reduces battery life. Embodiments of the present invention permit tolerances between the spindle shaft and the sleeve to be relaxed, thereby reducing power consumption, because additional stiffness is provided by the addition of the frusto-conical or similar multipurpose bearing.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
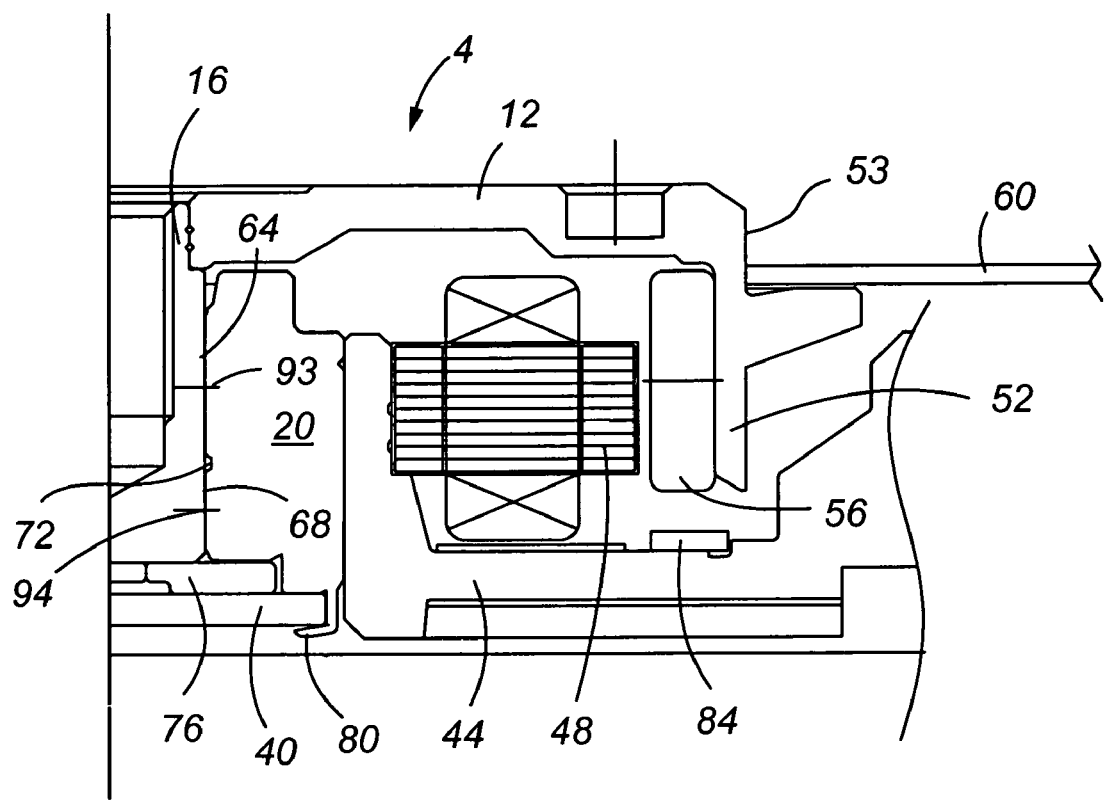
FIG. 1 is a partial sectional view of a disk drive with an under slung motor of the prior art.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein

DETAILED DESCRIPTION

Referring now to FIGS. 3-10, a disk drive 4 utilizing a generally conical-shaped bearing 8 is shown. The frusto-conical bearing is one embodiment of the multipurpose bearing of the present invention. Embodiments of the present invention include a hub 12 interconnected to a spindle shaft 16. A sleeve 20 comprising a journal bearing surface 22 surrounds at least a portion of the spindle 16. Journal bearing surface 22 interacts with an outer surface of the spindle shaft 16. The bearing 8 is attached to the base of the spindle shaft and includes an upper bearing surface 24 and a lateral or outer bearing surface 28. The upper bearing surface 24 interacts with a lower portion 32 of the sleeve. A groove may optionally be formed in one or both of the surfaces 24 and 32 for locating bearing fluid to enhance stiffness. The groove may have a spiral shape or other shape known to those of skill in the art. Similarly, the lateral surface 28 interacts with a complementary conical-shaped surface 36 formed on a closure plate 40 that is interconnected to the sleeve 20. In the preferred embodiment, the lateral surface 28 is disposed at an angle relative to the axis of rotation of the spindle. In one embodiment, the lateral surface is frusto-conical in shape, as is the complementary surface 36. One or both of the lateral surface 28 and complementary surface 36 may also contain a groove to enhance stiffness. A herringbone pattern is one example. Other shapes are known to those of skill in the art. The complementary surface 36 need not be formed on the closure plate, but may be formed on the sleeve 20 or as part of another structure as would be known to those of skill in the art. The sleeve 20 is fixed in position, such as to a base plate 44, and does not rotate. A stator motor, comprising a plurality of stator coils 48, is also mounted to the base plate. The configuration as shown in FIGS. 3-10 is of an "under slung" motor in which the stator motor is positioned beneath the hub. The hub 12 includes a cylindrical portion or skirt 52 depending from an outer edge 53. The outer edge 53 supports at least one disk 60. The cylindrical portion 52 provides a location for the interconnection of an annular permanent magnet 56. The controlled interaction of magnetic fields generated by the stator coils 48 and the permanent magnet 56 causes the hub 12 to rotate. The hub 12 rotates the spindle shaft 16 and both are stabilized by the journal bearings 22 and the multipurpose bearing 8.

Stabilization of the spindle shaft 16 is important because the disk 60 interacts with a read/write head positioned closely adjacent the surface of the disk. A wobbling or tilting motion of the spindle and/or the spindle bearing will cause the hub and disk to also wobble or flutter. This will alter the gap between the head and the disk 60 potentially causing read/write errors and perhaps damage either to the head or the disk 60. At the high rates of disk rotation used in disk drives, there is also a tendency for spindles to move radially from their original position. This can also cause problems in track following and reading data from and/or writing data to a disk. The journal bearing 22 adds radial stiffness and pitch or tilt stiffness to the spindle shaft 16. Loads that would tend to tilt the spindle shaft are counteracted by the interaction of upper bearing surface 24 of the multipurpose bearing 8 and the lower bearing surface 32 of the sleeve 20, and by interaction of the lateral conical bearing surface 28 and the conical surface 36 of the closing plate 40. Radial loads that would cause the spindle to move radially are counteracted by interaction of the upper bearing surface 24 and the outer surface of the spindle shaft 16, and by the interaction of lateral bearing surface 28 and complementary surface 32. Axial loads or thrust are also counteracted by the interaction of lower surface 61 of the conical bearing 8 and the upper surface 62 of the closing plate 40, but primarily by the interaction of the lateral conical bearing surface 28 and the conical bearing surface 36 of the closing plate 40. Because of the angled or conical shape of the lateral conical bearing surface 28 and the complementary surface 36 on the closing plate, the multipurpose bearing counteracts loads in the radial and axial directions, as well as tilt loads.

Referring now to FIG. 1, a disk drive assembly 4 of the prior art is shown. Here, the hub 12 is interconnected to the spindle shaft 16 that is supported radially by the sleeve 20. Sleeve 20 includes an upper bearing 64 and a lower bearing 68 with a gap 72 therebetween. The upper and lower bearings 64, 68 provide stiffness to the spindle, and counteract radial and pitch loading. In addition, axial loads are provided in part by thrust plate washer 76 that engages the end of the spindle shaft 16. The thrust plate washer 76 is interconnected to the closing plate 40 that is supported by an appendage 80 of the sleeve 20. The thrust plate may also counter some component of the pitch loading at the base of the spindle. In particular, in order to increase pitch stiffness, i.e. the resistance to spindle shaft 16 tilt in the prior art drive, the thrust plate washer 76 is made to bear upon the closing plate 40. This increased thrust or axial load will increase spindle stiffness. Spindle shaft stiffness may also be increased by increasing axial loading through use of a magnetic bias plate. The device of FIG. 1 employs a magnetic bias plate 84, which is generally a ring of ferro-magnetic material, that interacts with the permanent magnet 56 affixed to the hub as it rotates along with the spindle shaft 16. The magnetic pull between the permanent magnet 56 and the magnetic bias plate 84 forces the hub 12 and, in turn, the spindle shaft 16 onto the thrust plate washer 76 to increase spindle shaft 16 pitch resistance. The drawback of stiffening the spindle by increasing axial load is that the pressure between the thrust plate washer 76 and the closing plate 40 will increase, wherein power required to spin the disk 60 at a predetermined rate, which necessarily reduces battery life.

Figure 2:
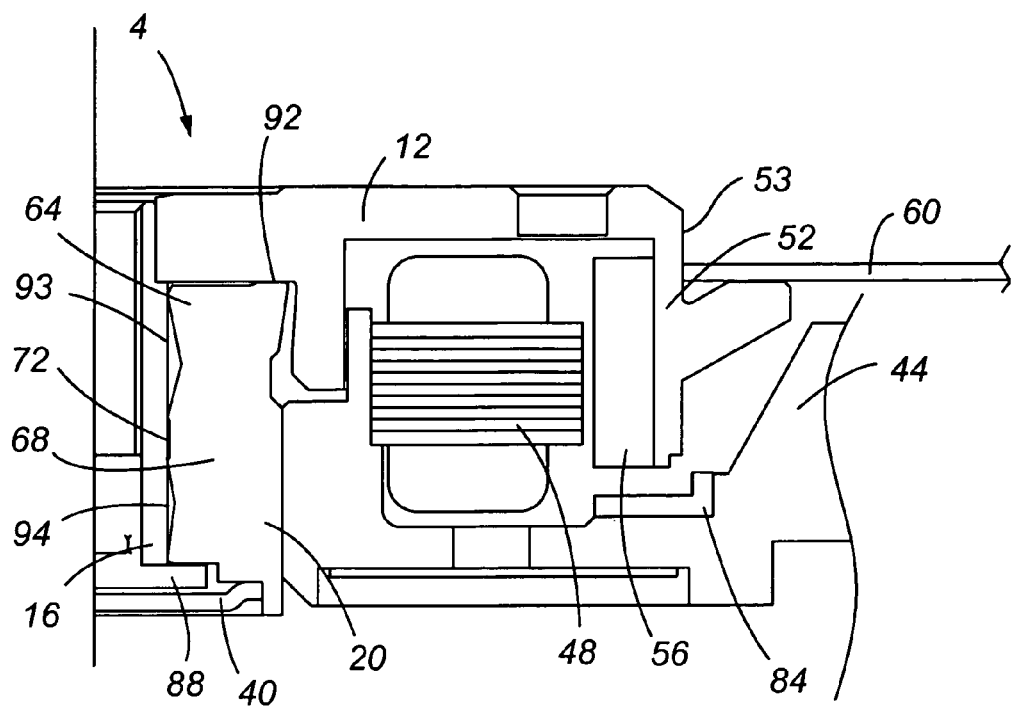
FIG. 2 is a partial sectional view of another disk drive with an under slung motor of the prior art.

Referring now to FIG. 2, yet another embodiment of the prior art disk drive 4 is shown that is similar to that previously described. Here, a spindle shaft 16 includes an external lip or flange 88 as opposed to a thrust bearing washer. In this instance, a thrust bearing 92 is also provided at the top of the sleeve 20. This disk drive 4 also includes a magnetic bias plate 84 that forces the hub 12 downwardly to increase the load between the thrust bearing 92 and the hub 12 to help stiffen the spindle shaft 16. As in the disk drive showing FIG. 1, the increase in pressure that is associated with axial stiffening technique increases power consumption and reduces battery life. The sleeve 20 also includes an upper journal bearing 64 and a lower journal bearing 68 wherein the gap 72 is located approximately at the center of the sleeve 20. The further the center 93 of the upper journal bearing 64 is from the center 94 of that lower journal bearing 68, the more stiffness is provided. Thus, as the height of the disk drive is decreased, the span between the centers 93, 94 of the upper bearing 64 and lower bearings 68 of any disk drive 4 will decrease thereby decreasing the radial stiffness provided to the spindle shaft 16.

Figure 3:
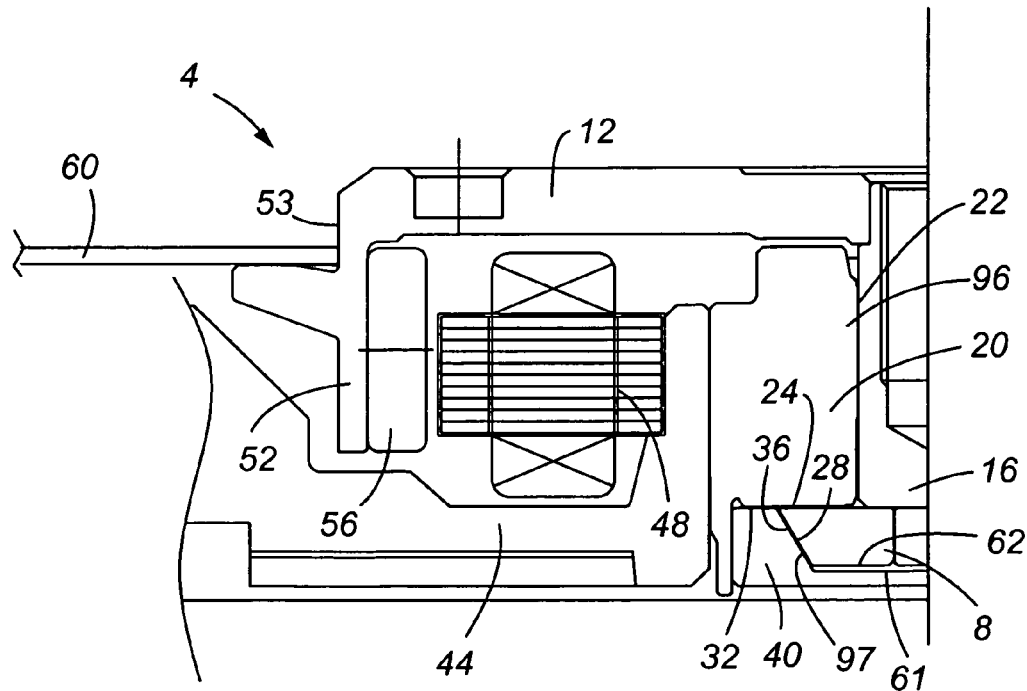
FIG. 3 is a partial sectional view of a disk drive with an under slung motor in accordance with an embodiment of the present invention.

Referring now to FIG. 3, a disk drive 4 of one embodiment of the present invention is shown that employs a conical bearing 8 interconnected to the lower end of the spindle shaft 16. The lateral surface 28 of the conical bearing 8 interacts with the conical inner surface 36 of closing plate 40. Preferably, some embodiments of the present invention include a conical bearing 8 with a lateral surface 28 having a herringbone shaped groove that helps distribute the oil or other bearing fluid between the two components. The upper surface 24 of the conical bearing 8 may have, in some embodiments of the present invention, a spiral shaped groove to also help distribute the bearing fluid.

Here, a journal bearing 22 is positioned on an inner surface of the sleeve 20 that helps to radially support the spindle shaft 16. Due to the shape of the conical bearing 8, it counteracts radial and pitch loads and it provides useful axial loading. Radial loads will be counteracted not only by the journal bearing 22, but also by the horizontal component of the lateral surface 28 of the conical bearing 8. In addition, because the conical bearing acts, in part, as a journal bearing, it also effectively increases the total bearing distance, i.e., the distance between the centers of the grooved bearing and the conical bearing. More specifically, the distance between the mid point 96 of the journal bearing 22 and the mid point 97 of the conical bearing 8 is increased thereby increasing pitch stiffness.

This embodiment of the present invention has its advantages over the prior art since a thrust bearing is no longer required given the useful axial loading provided by the conical bearing 8. In order to provide the required axial stiffness, the conical surfaces 28 and 36 interact, but not to excess. Thus, it is easily appreciated that the multipurpose bearing as described herein acts as both a journal bearing against radial and tilt forces and as a thrust bearing providing appropriate axial loading without increasing power consumption. In doing so, the multipurpose bearing allows for the height of the disk drive 4 to be decreased since the thrust washer of the prior art is no longer required.

Further, since the stiffness provided to the spindle shaft 16 is increased over the prior art, it is no longer necessary to include the magnetic bias plate as utilized by many prior art disk drives. Thus, another component can be omitted from the system which will decrease cost. In addition, the removal of the magnetic bias plate decreases one source of magnetic noise. However, should increased stiffness be required for a particular end use application, the magnetic bias plate may be included.

Figure 4:
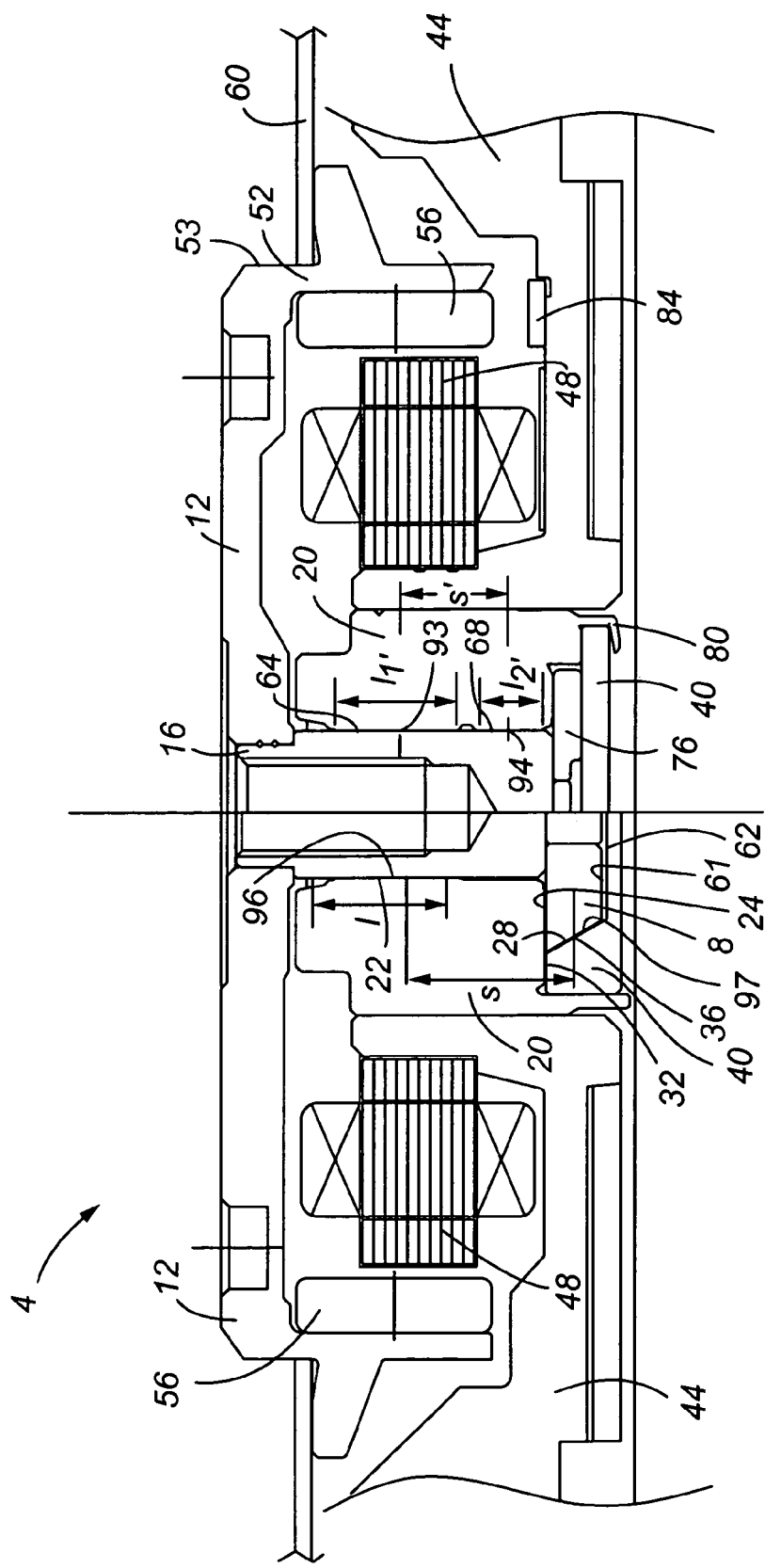
FIG. 4 is a comparative sectional view showing the disk drive of FIG. 1 along with that of FIG. 3.

Referring now to FIG. 4, a cross-sectional comparison view is shown, with one embodiment of the present invention that utilizes the conical bearing 8 on the left, compared with the embodiment of the prior art shown in FIG. 1 on the right. This figure is presented to illustrate one embodiment of the present invention wherein the length (l) of the journal bearing 22 is about 2.2 mm long and the span (s) between the mid point 97 of the conical bearing 8 and the midpoint 96 of the journal bearing 22 is about 3.15 mm. As mentioned above, this dimension is directly related to the stiffness of the spindle shaft, i.e. its resistance to radial and/or tilting movements. Conversely, with reference now to the sleeve 20 shown on the right side of the figure, the length ($l_1'$) of the upper journal bearing 64 is about 2.2 mm and the length ($l_2'$) of the lower journal bearing 68 is about 1.2 mm, the span (s') between the center points 93, 94 of these two journal bearings is about 1.96 mm. Thus, the stiffness afforded by the embodiments of the prior art is inferior to that present invention. In addition, the thrust plate washer 76, shown on the right side of FIG. 4, is no longer required, as is shown in the embodiment of the present invention shown on the left, because the conical bearing 8 provides additional axial stiffness and also provides increased radial and pitch stiffness.

As it will be understood by one skilled in the art, the side by side comparisons of these two disk drive 4 designs are laid out in such a fashion to illustrate the differences between the two systems. It should be understood that drawing sides may not be to scale. More specifically, since the thrust bearing washer 76 is no longer required by embodiments of the present invention, the disk drive 4 height on the left may be decreased somewhat thereby making it more desirable to use in smaller electronic devices.

Figure 5:
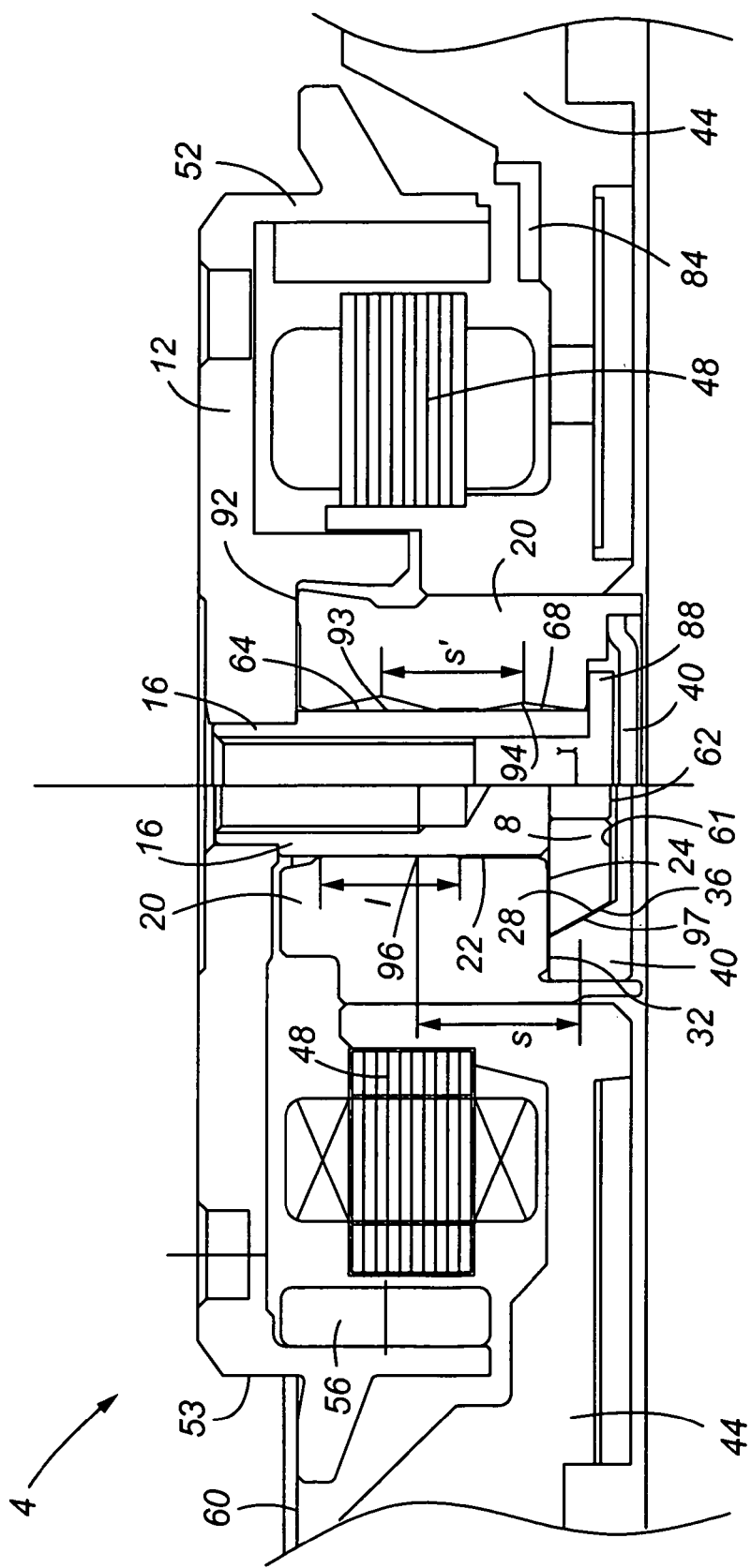
FIG. 5 is a comparative sectional view showing the disk drive of FIG. 2 along with that of FIG. 3.

Referring now to FIG. 5, yet another side by side comparison is illustrated. More specifically, one embodiment of the present invention is shown on the left and compared to the prior art embodiment described in FIG. 2 on the right. Briefly, as described in detail above with respect to FIG. 4, it is shown herein how portions of the prior art systems are no longer required, due to the advantages of the present invention, thereby allowing increased performance. More specifically, the distance (s) between the center 97 of the conical bearing 8 and the center 96 of the journal bearing 22 is about 3 mm and a journal bearing surface (l) of 2.2 mm is provided. Conversely, the prior art disk drive 4 provides two separate journal bearing surfaces that have a journal span (s') of about 2.38 mm. Again, the span between the journal bearings is directly related to the stiffness provided to the spindle shaft. Thus, it is shown herein that embodiments of the present invention will perform better than the prior art systems without the need for additional hardware, such as magnetic bias plates.

With reference now again to FIGS. 1-5, a calculation of the pitch stiffness of disk drives in the art along with one embodiment of the present invention has been conducted. The table below illustrates the performance of disk drives employing the thrust bearing washer 76 and the upper thrust bearing 92 of FIGS. 1 and 2, respectively, and the conical bearing 8 of FIG. 3. As the data shows, the stiffness provided to the spindle shaft 16 of the embodiment of FIG. 3 is comparable to or greater than that of the prior art embodiments of FIGS. 1 and 2. More specifically, the table below shows pitch compliance, the amount of displacement of the spindle shaft 16 per amount of force applied thereto. As it can be seen from the test results, one embodiment of the present invention provides a pitch compliance of about 2.86E-3 rad/N, while the prior art invention of FIG. 1 has only a slightly better pitch compliance of 2.16E-3 rad/N. However, with reference to the pitch compliance of the prior art embodiment shown in FIG. 2, it is shown that the pitch compliance of the embodiment of the present invention is greatly improved over that of the prior art. In addition, it is also shown that the bearing span of the embodiment of the present invention, 3.15 mm, is greatly increased over both prior art embodiments shown in FIGS. 1 and 2. Thus, the multipurpose bearing of the present invention effectively increases the journal bearing span and, therefore, provides greater stiffness to the spindle shaft. Critically, the increased bearing span is achieved while simultaneously permitting a reduction in the overall height of the disk drive. More specifically, the bearing span increases because the multipurpose bearing provides a component that counteracts radial and pitch loading, thereby acting as a second journal bearing, while also allowing elimination of the thrust bearing of the prior art embodiments. This provides comparable overall stiffness while allowing the entire disk drive to be reduced in height.

| Embodiment | FIG. 1 | FIG. 2 | FIG. 3 |
| --- | --- | --- | --- |
| Height | 2.5 mm | 2.4 mm | 2.5 mm |
| Speed (rpm) | | 5400 | |
| Shaft Dia (mm) | 2.5 | 2.4 | 2.4 |
| Ambient Temperature (° C.) | | 80 | |
| Bearing Span (mm) | 2.384 | 1.96 | 3.15 |
| Pitch Compliance (rad/N) | 2.16E-3 | 4.60E-3 | 2.86E-3 |

Figure 6:
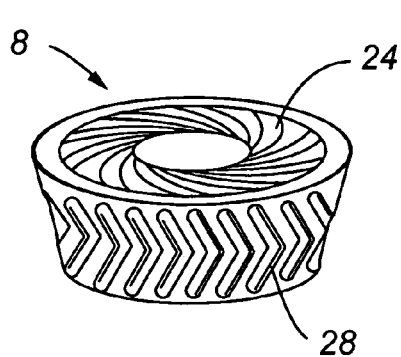
FIG. 6 is a perspective view of a conical bearing in accordance with an embodiment of the present invention.
Figure 7:
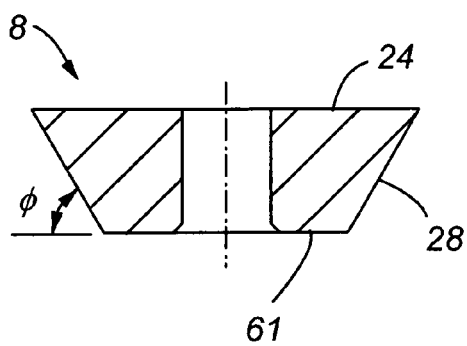
FIG. 7 is a cross sectional view of the conical bearing shown in FIG. 6.

Referring now to FIGS. 6 and 7, a conical bearing 8 is shown. More specifically, one embodiment of the conical bearing 8 includes at least an upper bearing surface 24 and a lateral bearing surface 28. Preferably, some embodiments of the present invention employ a spiral groove on the upper bearing surface 24 and/or the lower surface 32 of the sleeve that helps distribute fluid between bearing surfaces. In addition, some embodiments of the present invention include a lateral bearing surface 28 that has a herringbone shape thereby allowing for a more efficient distribution of fluid between the inner surface of the closing plate and the lateral surface 28. One skilled in the art will appreciate that angle φ, as shown in FIG. 7, may be altered in order to change the amount of axial, i.e. thrust, stiffness provided by the conical bearing 8. In one embodiment of the present invention, α is equal to about 60 degrees.

Figure 8:
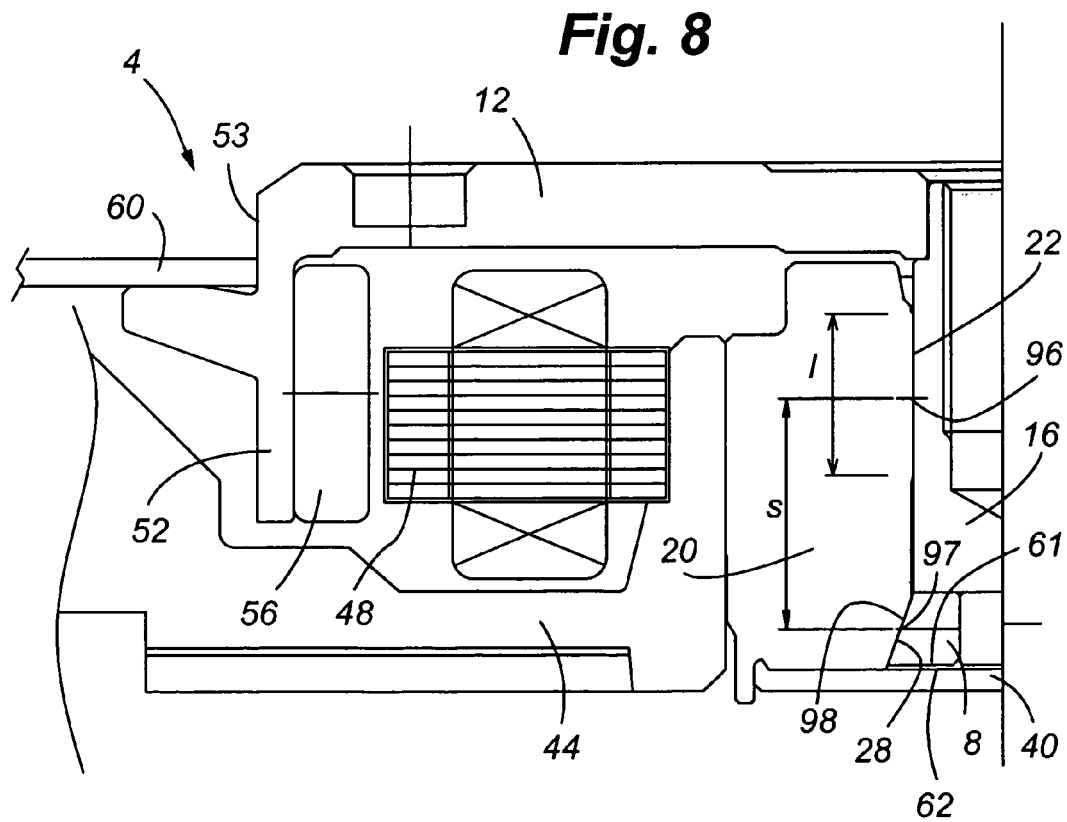
FIG. 8 is a partial sectional view of a disk drive with an under slung motor in accordance with another embodiment of the present invention that utilizes a conical bearing oriented opposite from that shown in FIG. 3.

Referring now to FIG. 8, yet another embodiment of the present invention is provided that utilizes a conical bearing 8. However, in this embodiment of the present invention, the orientation of the conical bearing 8 is reversed compared to the embodiment of FIG. 3. Here, the lateral surface 28 interacts with a conical surface 98 of the sleeve 20. In this example, the bearing surface (s) provided is about 3.15 mm, which includes 2.2 mm (I) of traditional journal bearing 22 that interacts with the spindle shaft 16. Axial loads are reacted by the bearing surface 61 interacting with bearing surface 62 of closure plate 40 in conjunction with interaction between the bearing surface 28 and the complimentary surface 98 of the 20 sleeve.

Figure 10:
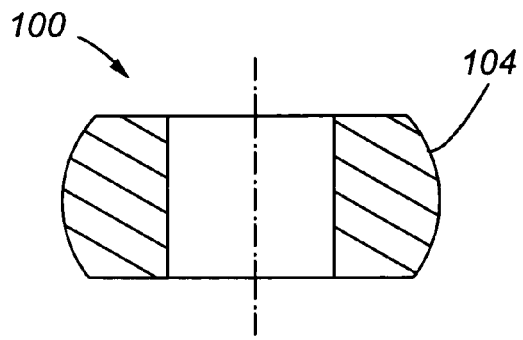
FIG. 10 is a cross sectional view of the spherical bearing shown in FIG. 9.
Figure 9:
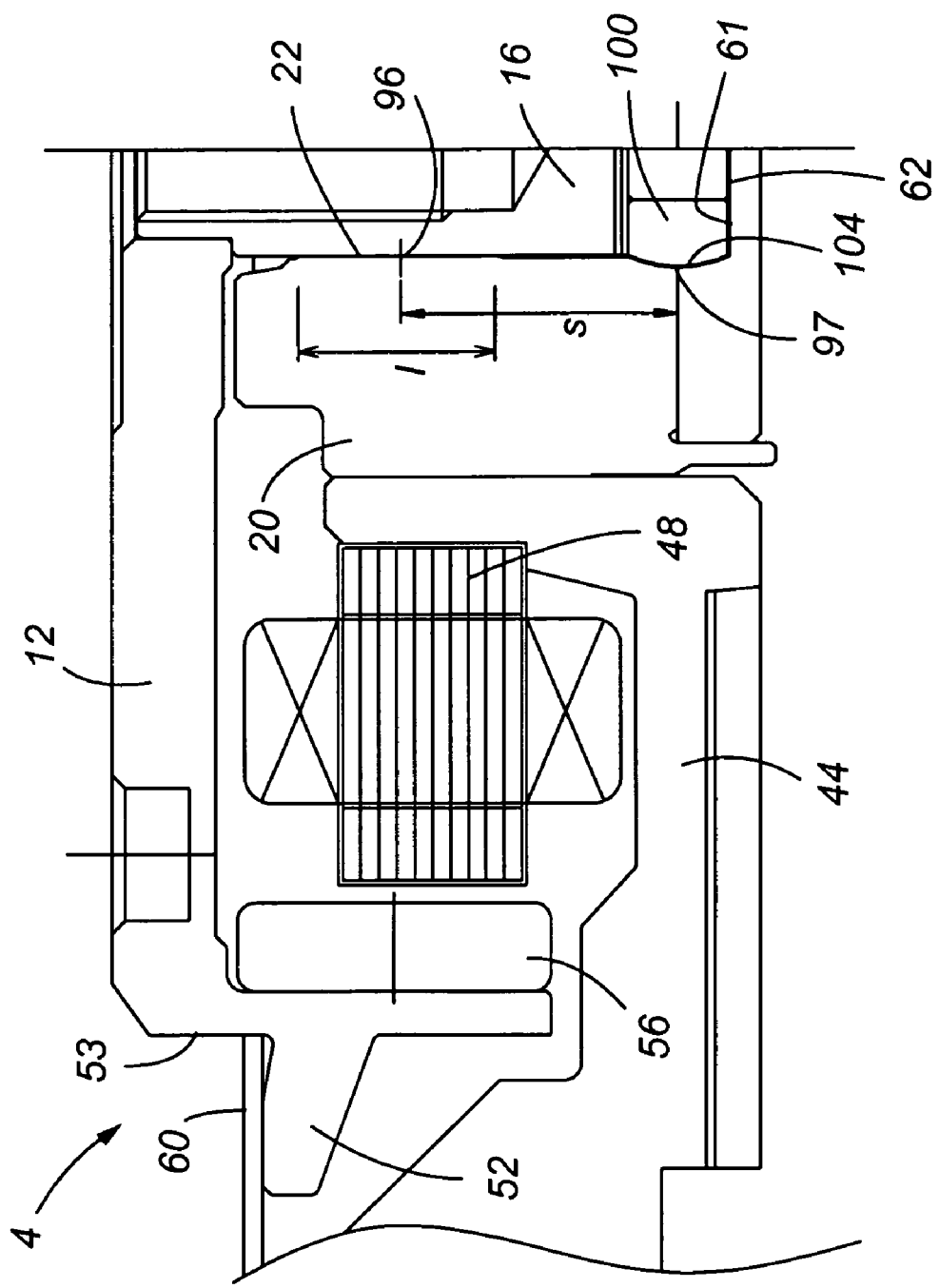
FIG. 9 is a partial sectional view of a disk drive with an under slung motor in accordance with another embodiment of the present invention that utilizes a spherical bearing.

Referring now to FIGS. 9 and 10, yet another embodiment of the present invention utilizing a spherical bearing 100 is shown. This embodiment of the present invention is very similar to that presented in FIG. 3. However, a spherical bearing 100 is utilized that interacts with the sleeve 20 and the closure plate 40. However, one skilled in the art will appreciate that the closure plate 40 thickness may be increased such that the entire lateral surface 104 of the spherical bearing is in contact therewith, similar to that is shown in FIG. 3. The effective bearing surface (s) provided by this embodiment of the present invention is about 3.09 mm, which is an increase over those of the prior art.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A fluid dynamic bearing, comprising:
a hub that is adapted to receive a disk;
a spindle shaft interconnected to said hub;
a sleeve positioned around said spindle shaft, said sleeve having a radial bearing surface that interacts with an outer surface of said spindle shaft; and
a multipurpose bearing interconnected to an end of said spindle shaft having an inverted conical surface, an upper surface above said inverted conical surface and a lower surface below said inverted conical surface and said lower surface having a smaller surface area than said upper surface.

2. The fluid dynamic bearing of claim 1, wherein an intersection of the upper surface and the inverted conical surface of the multipurpose bearing forms an angle that is less than 90 degrees.

3. The fluid dynamic bearing of claim 1, further comprising:
a closure plate having a first complementary bearing surface adjacent said inverted conical surface of said multipurpose bearing.

4. The fluid dynamic bearing of claim 3, wherein said conical surface is frusto-conical in shape.

5. The fluid dynamic bearing of claim 3, wherein said closure plate includes a second complementary bearing surface adjacent said lower surface.

6. The fluid dynamic bearing of claim 5, wherein said closure plate includes a groove.

7. The fluid dynamic bearing of claim 3, wherein said conical surface includes a groove integrated thereon.

8. The fluid dynamic bearing of claim 7, wherein the groove has a herringbone pattern.

9. The fluid dynamic bearing of claim 3, wherein said upper surface includes a groove integrated thereon.

10. The fluid dynamic bearing of claim 9, wherein the groove is spiral shaped.

11. The fluid dynamic bearing of claim 1, wherein said conical surface is partially spherical in shape.

12. The fluid dynamic bearing of claim 1, wherein the distance between the center of said radial bearing and the center of said multipurpose bearing is between about 2.8 and 3.2 mm.

13. The fluid dynamic bearing of claim 1, wherein said sleeve has a bottom bearing surface disposed generally perpendicular to an axis of rotation of the spindle, and wherein said upper surface of said multipurpose bearing is adjacent said bottom surface of said sleeve and said inverted conical surface is adjacent a first complementary bearing surface of a closure plate disposed at one end of the spindle shaft.

14. The fluid dynamic bearing of claim 13, wherein said upper surface and said conical surface of said multipurpose bearing comprise grooves.

15. A fluid dynamic bearing, comprising:
a spindle shaft;
a sleeve positioned around said spindle shaft;
a first bearing connected to an end of said spindle shaft, said first bearing including a first bearing surface disposed at an angle relative to an axis of rotation of said spindle shaft, a second bearing surface above said first bearing surface and a third bearing surface below said first bearing surface and said third bearing surface having a smaller surface area than the second bearing surface;

a complementary bearing surface that interacts with said first bearing surface, said complementary bearing surface fixed in position relative to said spindle.

16. The fluid dynamic bearing of claim 15, further comprising:
a closure plate having the complementary bearing surface adjacent said first bearing surface.

17. The fluid dynamic bearing of claim 16, wherein said first bearing surface has a groove integrated thereon.

18. The fluid dynamic bearing of claim 16, wherein said lower bearing surface of said first bearing is substantially perpendicular to said axis of rotation of said spindle.

19. The fluid dynamic bearing of claim 18, wherein said sleeve comprises a bearing surface disposed generally perpendicular to said axis of rotation of said spindle and adjacent said second bearing surface, and said sleeve bearing surface interacts with said second bearing surface to counteract pitch loading on said spindle.

20. The fluid dynamic bearing of claim 15, wherein said first bearing surface is partially spherical in shape.

21. The fluid dynamic bearing of claim 15, wherein the distance between the center of said journal bearing and the center of said second bearing is between about 2.8 and 3.2 mm.

22. A fluid dynamic bearing, comprising:
a rotatable shaft having an axis of rotation;
a rotatable hub adapted to receive a magnetic storage medium, said hub interconnected to said shaft;
a cylindrical bearing surface, and
a multipurpose bearing associated with said shaft, said multipurpose bearing including a first bearing surface disposed at an angle relative to the axis of rotation of said rotatable shaft, a second bearing surface above said first bearing surface and a third bearing surface disposed below said first bearing surface, the third bearing surface having a smaller surface area than said second bearing surface.

23. The fluid dynamic bearing of claim 22, further comprising:
a closure plate having first complementary bearing surface adjacent said first surface of said multipurpose bearing.

24. The fluid dynamic bearing of claim 23, wherein at least one of said first bearing surface and said second bearing surface include a groove.

25. The fluid dynamic bearing of claim 24, wherein the groove is spiral shaped or herringbone shaped.

26. The fluid dynamic bearing of claim 22, wherein said multipurpose bearing comprises a lateral surface that has a partial spherical shape.

27. The fluid dynamic bearing of claim 22, further comprising a journal bearing, and wherein the journal bearing has a center and the bearing means has a center, and the distance between the center of said journal bearing and the center of said bearing means is between about 2.8 and 3.2 mm.

28. In a fluid dynamic bearing having a rotatable spindle, a hub mounted on said spindle and adapted to rotate with said spindle, at least one disk mounted on said hub, a journal bearing disposed about said spindle and including a first bearing surface that interacts with the outer surface of said spindle, the improvement comprising:
a second bearing disposed at one end of said spindle, said second bearing comprising a first bearing surface, a second bearing surface above said first bearing surface and a third bearing surface below said first bearing surface, and said second bearing surface has a larger surface area than said third bearing surface.

29. The fluid dynamic bearing of claim 28, further comprising:
a closure plate having first complementary bearing surface adjacent said first surface of said multipurpose bearing.

30. The fluid dynamic bearing of claim 28, wherein said first bearing surface is curved.

31. The fluid dynamic bearing of claim 30, wherein the curved surface is concave.

32. The fluid dynamic bearing of claim 30, wherein the curved surface is convex.

33. The fluid dynamic bearing of claim 28, wherein said first bearing surface is disposed at an angle relative to the axis of rotation of said spindle, other than a right angle.

34. The fluid dynamic bearing of claim 28, wherein the third bearing surface is substantially perpendicular to an axis of rotation of said spindle.

35. The fluid dynamic bearing of claim 28, wherein the second bearing surface is substantially perpendicular to the axis of rotation of the spindle.

\* \* \* \* \*